United States Patent Office 3,038,789
Patented June 12, 1962

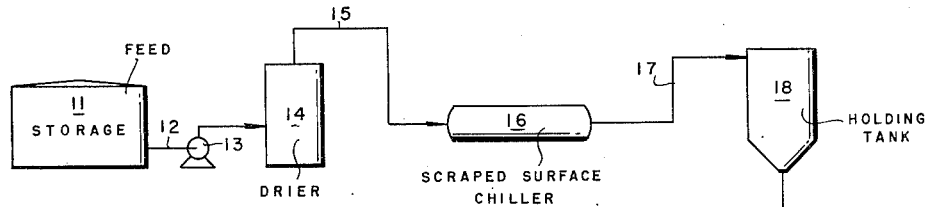
FIG. 1.
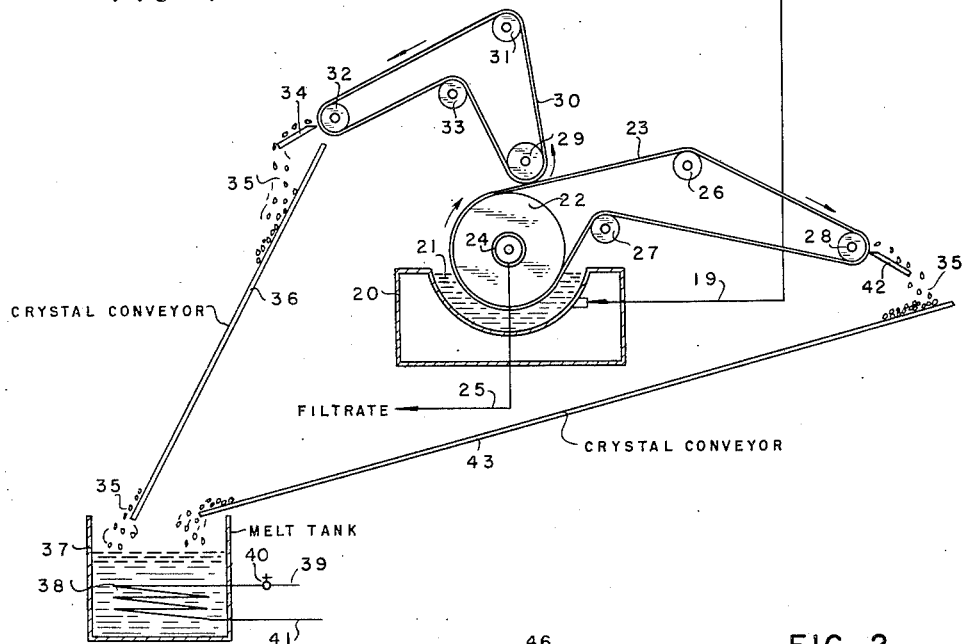
FIG. 2.
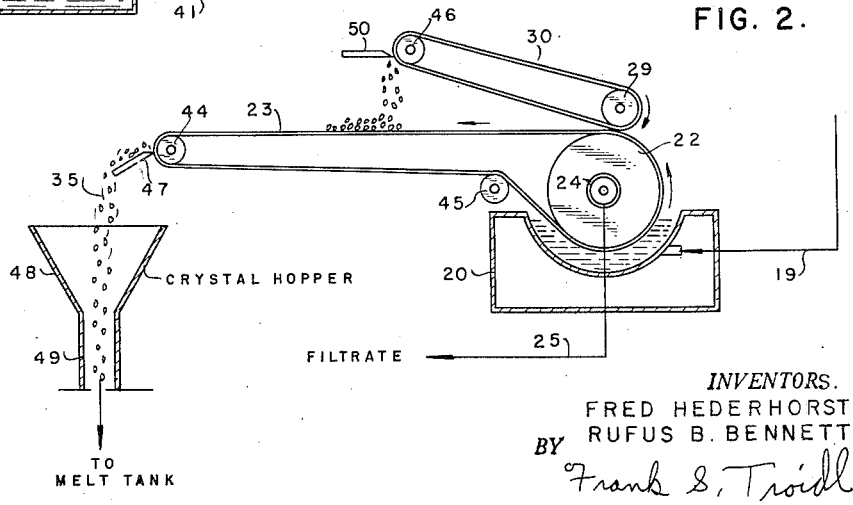
INVENTORS.
FRED HEDERHORST,
RUFUS B. BENNETT,
BY Frank S. Troidl
ATTORNEY.

3,038,789
APPARATUS FOR PURIFYING HYDROCARBONS BY CRYSTALLIZATION
Rufus B. Bennett, Scarsdale, N.Y., and Fred Hederhorst, Baytown, Tex., assignors, by mesne assignments, to Esso Research and Engineering Company, Elizabeth, N.J., a corporation of Delaware
Continuation of application Ser. No. 603,633, Aug. 13, 1956. This application June 17, 1959, Ser. No. 820,908
1 Claim. (Cl. 23—273)

The present invention is directed to an apparatus for recovering purified hydrocarbons. More particularly, the invention is directed to an apparatus for purifying hydrocarbons by crystallization. In its more specific aspects, the invention is concerned with recovering purified hydrocarbons from mixtures thereof by crystallization and filtration.

This is a continuation of our copending application Serial No. 603,633, filed August 13, 1956, entitled "Purifying Hydrocarbons by Crystallization," now abandoned.

The present invention may be briefly described as an apparatus for separating a crystallizable hydrocarbon from its mixtures with other hydrocarbons which comprises forming a chilled slurry containing crystals of said hydrocarbon in a mother liquor. The slurry is filtered to recover a crystalline filter cake which then has a sufficient pressure imposed thereon for a sufficient length of time to remove residual mother liquor and to purify the cake. The purified cake is recovered and melted to obtain the purified hydrocarbon.

The crystallizable hydrocarbon mixtures employed in the practice of the present invention may suitably be any aromatic or naphthenic hydrocarbon boiling in the range from about 150° to about 650° F. and suitably may include aromatic and naphthenic hydrocarbons such as benzene, toluene, and xylenes, such as ortho, meta and paraxylene, durene, prehnitene, hemimellitene, naphthalene, dimethylnaphthalene, cyclohexane, and the like. Typical feed stocks, such as paraxylene, may contain from about 10 to about 25% by weight paraxylene while durene-containing feeds suitable for charge to the present invention may contain from about 10% to about 25% of durene. Cyclohexane fractions containing from about 75% to 98% cyclohexane may be employed. These percentages are on a weight basis.

A typical analysis of a paraxylene fraction suitable as a feed stock is shown below:

TABLE I

| | Weight percent |
|---|---|
| Paraxylene | 15.8 |
| Orthoxylene | 20.0 |
| Metaxylene | 39.6 |
| Ethylbenzene | 18.6 |
| Toluene | 3.5 |
| Others (paraffin, naphthene, $C_9$ aromatics) | 2.5 |
| Total | 100.0 |

A typical analysis of a durene-containing feed fraction is presented in Table II which follows:

TABLE II

| | Weight percent |
|---|---|
| Durene | 16.9 |
| Isodurene | 22.0 |
| Total aromatics | 96 |
| Paraffins | 4 |

A typical hydrocarbon analysis of a cyclohexane fraction suitably employed as a feed stock is shown in Table III.

TABLE III

| | Weight percent |
|---|---|
| Cyclohexane | 87.9 |
| Methylcyclopentane | 0 |
| 2,2-dimethylpentane | 1.88 |
| 2,4-dimethylpentane | 5.12 |
| 2,2,3-trimethylbutane | 1.13 |
| 3,3-dimethylpentane | 0.98 |
| 1,1-dimethylcyclopentane | 0.40 |
| 2,3-dimethylpentane | 0.94 |
| 3-methylhexane | 1.09 |
| 2-methylhexane | 0.56 |
| Total | 100.00 |

The pressures employed in the practice of the present invention may range from about 15 to about 2000 pounds per square inch gauge.

Paraxylene may be purified satisfactorily employing pressures ranging from about 30 to about 1000 pounds per square inch gauge although higher pressures may be employed. Durene may be suitably purified while employing pressures ranging from about 200 to about 2000 pounds per square inch gauge with satisfactory results obtained from about 400 to about 1000 pounds per square inch gauge.

Cyclohexane may be purified by imposing pressures from about 200 to about 2000 pounds per square inch gauge with satisfactory results obtained at pressures in the range from about 200 to about 1000 pounds per square inch gauge on the filter cake.

The pressures employed in each particular instance may vary within the range given depending on the purity of the filter cake.

The pressure should be imposed on the filter cake for a sufficient length of time to remove residual mother liquid entrained in or included with the crystallized hydrocarbon. This time may range from about 15 seconds to about 300 seconds with quite satisfactory results obtained at about 30 to about 120 seconds.

Temperatures employed may vary with the particular feed stocks. In general, a temperature in the range from about −20° to about −120° F. will be satisfactory with a preferred temperature range from about −40° to about −100° F.

The filtering operation may be conducted in any suitable filtering equipment. For example, it may be conducted by rotating a cylindrical drum having a filter cloth thereon in a body of the chilled slurried hydrocarbon. A suitable filter having leaves of filter material may be employed or filter surfaces, such as filter paper, may be used.

The filter cloth may be constructed of cotton, nylon, metallic or mineral fabrics or the like. Suitable filter cloths constructed of interwoven strings, fibers and the like process satisfactorily in the practice of the present invention.

The pressure imposed on the filter cake may suitably be imposed thereon by employing a rotating cylinder or drum which is superimposed on the rotating cylindrical filter drum although pressure may be applied in different manners such as by pressing the filter cake either in situ on the filter surface or after removal from the filtering surface. It is preferred to press the filter cake on the filtering surface.

The invention is quite advantageous and useful in that it allows the obtaining of high purity crystalline hydrocarbon and mixtures thereof in a one-stage operation without recourse to recrystallization and melting operation. Furthermore, the present invention is unique in that contrary to what might be expected, imposition of pressure allows the purification. Since the crystallizable hydrocarbon is in a mother liquor and is in contact with a mother liquor in which the crystals are soluble, it ordinarily would be thought that imposition of pressure thereon would cause the crystals to redissolve in the mother liquor rather than purify same. The present invention is, therefore, advantageous and allows the obtaining of unexpected results.

The invention will be further illustrated by reference to the drawing in which:

FIG. 1 is in the form of a flow diagram of a preferred mode, and

FIG. 2 shows a modification of the apparatus of FIG. 1.

Referring now to the drawing in which identical numerals will be employed to designate identical parts, numeral 11 designates a charge tank in which is stored a hydrocarbon fraction which may be a xylenes fraction containing paraxylene which it is desired to recover. The paraxylene fraction in tank 11 is withdrawn by line 12 containing a pump 13 and introduced thereby into a drier 14 which may contain a bed or body of a suitable water adsorbent medium, such as alumina, so as to remove moisture and other impurities as may be desired. The dried paraxylene fraction is then withdrawn from zone 14 by line 15 and is then discharged thereby into a scraped surface chiller 16 wherein the temperature is reduced to a temperature in the range of $-80°$ to $-100°$ F. After chilling in scraped surface chiller 16, a slurry of paraxylene crystals and other xylenes is formed and the chilled slurry is then introduced by line 17 into a holding tank 18 maintained at a temperature in the range from $-80°$ to $-100°$ F. wherein the chilled slurry resides therein for a time within the range of 30 to 120 minutes to allow crystal growth. The holding tank 18 may suitably be insulated to maintain the temperature and may contain chilling coils or the paraxylene slurry may be circulated through heat exchangers and the like to maintain the temperature.

After the residence time indicated, the slurry, containing crystals of the proper size and configuration for ready separation by filtration, is withdrawn from tank 18 by line 19 and introduced thereby into a filtering means 20 comprised of a reservoir 21 and a rotating filter drum 22. The paraxylene slurry in reservoir 21 is deposited on the filter cloth 23 with the filtrate being filtered therethrough into the interior of the rotating drum 22, the filtrate being withdrawn through a channel 24 in the interior of the drum and having a common longitudinal axis with the axis about which the drum 22 rotates. Reduced pressure may be maintained on the interior of drum 22 to facilitate drainage of filtrate through the cloth 23. The filtrate is withdrawn from channel 24 by line 25 for further use or for recycling to tank 11 for recovery of paraxylene not removed from the slurry in reservoir 21.

The filter cloth 23 passes over rotating cylinders 26, 27, and 28. Prior to the filter cloth 23 containing the filter cake of paraxylene crystals thereon being removed from the region of the drum 22, pressure is imposed on the filter cake by means of a rotating cylinder 29 over which a second filter cloth 30 is arranged and which passes over rotating cylinders 31, 32, and 33.

It might be mentioned that cylinders 26 and 27 may be powered to provide the drive for the rotating drum 22 while cylinders 31 and 33 may provide the power for rotating drum 29. Drum 22 and drum 29 may be powered for rotation of same as may be desired. As the drum 29 rotates, a portion of the crystals on filter cloth 23 may be picked up by cloth 30 and these crystals may be removed from the filter cloth 30 by a suitable doctor or knife 34 which causes the crystals 35 to fall on a crystal conveyor belt 36 which introduces crystals 35 into a melting tank 37 provided with a heating means such as a steam coil 38 connected by line 39 controlled by valve 40 to a source of superheated steam, the exhaust steam being withdrawn from coil 38 by line 41.

Suitably the filter cloth 23 may likewise be provided with a doctor or knife 42 for removal of crystals 35 therefrom and to discharge same to crystal conveyor belt 43 by means of which the crystals removed by doctor 42 are discharged into the melting tank 37.

The pressure imposed on the filter cake on the filter surface 23 may be varied within the range given by raising or lowering the rotating drum 29 as may be desired.

A modification of the present invention is shown in FIG. 2 wherein the drum 22 is arranged in a filter means 20 provided with a reservoir 21 for the slurry. In this particular instance, the filter cloth 23 is arranged over rotating drums 44 and 45 and the drum 29 is superimposed on the filter cloth 23 with the filter cloth 30 being arranged over a rotating drum 46. Adjacent the drum 44 is a knife or doctor 47 for removing crystals 35 from the filter cloth 23. These crystals fall into a crystals hopper 48 which discharges by way of conduit 49 into melt tank 37. The drum 46 has a doctor or knife 50 arranged adjacent thereto to remove crystals 35 from the filter cloth 30 and these crystals fall onto the filter cloth 23 and are removed therefrom as has been described.

The invention will be further illustrated by certain operations which were conducted. A crystalline slurry containing 82% paraxylene crystals was pressed between layers of filter paper supported by steel plates. Pressure ranging from about 30 to about 300 pounds per square inch gauge was imposed on these crystals. The crystals were at a temperature on charging to the press of about $-95°$ F. The results of these operations are presented in the following table:

TABLE IV

| Feed Stock | First-stage Crystals, 82.1% Paraxylene |
|---|---|
| Processing Technique | Crystals pressed between layers of filter paper supported on steel plates. |
| Temp. of Crystals Charged to Press | About $-95°$ F. |

| Product Purity and Yield After Applying Following Pressure to Press | Cake Purity, Wt. Percent PX | Cake Recovered, Wt. Percent F. | Filtrate, Wt. Percent F. |
|---|---|---|---|
| 31 p.s.i.g. | 90.9 | 88 | 12 |
| 62 p.s.i.g. | 92.3 | 87 | 13 |
| 94 p.s.i.g. | 93.2 | 75 | 25 |
| 125 p.s.i.g. | 93.6 | 71 | 29 |
| 187 p.s.i.g. | 94.3 | 65 | 35 |
| 312 p.s.i.g. | 95.1 | 60 | 40 |

These results show that purified paraxylene in substantial yields may be obtained by employing pressures from 31 pounds per square inch gauge to about 312 pounds per square inch gauge on the crystals obtained from a first stage operation.

Comparing these desirable results in accordance with the present invention with the prior art practices, it was found that comparable purities were only obtained by recrystallization in one instance of the crystalline cake from a first stage operation and by partial melting and recrystallization of the crystals from a first stage operation. Centrifuging of crystals from a first stage operation do not give the purity product obtainable in the practice of the present invention.

Additional runs were made with a crystalline slurry that contained 79.6% paraxylene and obtained from a feed stock as has been described. This crystalline slurry was filtered and the filter cake was then subjected to pressure on a filter with a cylindrical roller. The results obtained from these operations are presented in the following table:

TABLE V
Purification of Paraxylene

| Charge Stock | First Stage Paraxylene Crystals | | | | | |
|---|---|---|---|---|---|---|
| Charge Purity, Wt. Percent | 79.6 | | | | | |
| Charge Temp. ° F | −95 | | | | | |
| Diameter of Crystal Bed, Inches | 2.75 (5.935) | | | | | |
| Depth of Crystal Bed, Inches | ⅜ | | | | | |
| Pressure, p.s.i | 219 | 422 | 797 | 995 | 995 | 1939 |
| Time Pressure was Maintained, seconds | 60 | 60 | 60 | 60 | 180 | 60 |
| Cake Charged, Parts | 33 | 33 | 33 | 34 | 33 | 33 |
| Cake Recovered, Parts | 28 | 26.5 | 16 | 20 | 19 | 14 |
| Cake Crystal Point, ° F | +8.6 | +8.9 | +12.3 | +11.9 | +12.5 | +13.0 |
| Cake Purity | 89.3 | 90.0 | 97.7 | 96.9 | 98.2 | 99.3 |
| Cake Yield, Wt. Percent Feed | 84.8 | 80.3 | 48.5 | 58.9 | 57.6 | 42.4 |
| Filtrate, Parts | 5 | 6.5 | 17 | 14 | 14 | 19 |

These results show that satisfactory purity stocks above 90% are obtained by employing pressures ranging from about 400 to about 1000 pounds per square inch gauge. Higher pressures further purify the product. A time of about 60 seconds was satisfactory.

A slurry of durene crystals and mother liquor was then filtered to form a filter cake and had pressure imposed thereon by a roller press. The results of these operations are shown in the following table:

TABLE VI
Purification of Durene

| Charge Stock | First Stage Durene Crystals | | | | | |
|---|---|---|---|---|---|---|
| Charge Purity Wt. Percent Durene | 59.0 | | | | | |
| Charge Temp., ° F | −50 | | | | | |
| Diameter of Crystal Bed, Inches | 2.75 | | | | | |
| Depth of Crystal Bed, Inches | ⅜ | | | | | |
| Pressure, p.s.i | 219 | 422 | 797 | 995 | 995 | 1939 |
| Time Pressure was Maintained, seconds | 60 | 60 | 60 | 60 | 180 | 60 |
| Cake Charged, Parts | 36 | 36.5 | 36 | 36 | 35 | 36.5 |
| Cake Recovered, Parts | 24 | 27 | 20 | 20 | 19.5 | 18 |
| Cake Crystal Point, ° F | 152.0 | 156.5 | 164.0 | 165.0 | 166.0 | 167.3 |
| Cake Purity, Wt. Percent | 79.0 | 81.5 | 88.5 | 89.5 | 91.0 | 92.5 |
| Cake Yield, Wt. Percent Feed | 66.7 | 76.0 | 55.6 | 55.6 | 55.7 | 49.3 |
| Filtrate, Parts | 12 | 9.5 | 16 | 16 | 15.5 | 18.5 |

It will be seen from the data in the foregoing table on durene that high purity durene filter cakes were obtained while imposing pressure from about 800 to about 1000 pounds on the filter cake. Higher pressures for extended periods of time further purified the cake. Pressures from about 800 to about 1000 pounds for about 60 seconds give satisfactory results.

Additional runs were made on a cyclohexane slurry which was filtered to form a filter cake. Pressure was imposed on this filter cake by means of the roller press. The results of these operations are shown in the following table:

TABLE VII
Purification of Cyclohexane

| Charge Stock | First Stage Cyclohexane Crystals | | | | |
|---|---|---|---|---|---|
| Charge Purity, Wt. Percent | 97.4 | | | | |
| Charge Temp., ° F | −50 | | | | |
| Diameter of Crystal Bed, Inches | 2.75 | | | | |
| Depth of Crystal Bed, Inches | ⅜ | | | | |
| Pressure, p.s.i | 219 | 422 | 797 | 995 | 1939 |
| Time Pressure was Maintained, Seconds | 60 | 30 | 60 | 60 | 30 |
| Cake Charged, Parts | 28 | 28 | 29 | 27 | 29 |
| Cake Recovered, Parts | 16 | 14 | 14.5 | 13 | 12 |
| Cake Purity, Wt. Percent Cyclohexane | 98.2 | 98.2 | 98.4 | 98.4 | 98.4 |
| Cake Yield, Wt. Percent Feed | 57.1 | 50.0 | 50.0 | 48.1 | 41.4 |
| Filtrate, Parts | 12 | 14 | 14.5 | 14 | 17 |

It will be seen from the data in the foregoing table that purified cyclohexane may be readily obtained by imposing pressure on a cyclohexane filter cake.

While the invention has been illustrated by specific examples, it is to be understood that these examples are given by way of illustration and not by way of limitation since it is intended that the invention is not to be limited to the specific naphthenic and aromatic hydrocarbons employed.

The nature and objects of the present invention having been completely described and illustrated what we wish to claim as new and useful and to secure by Letters Patent is:

An apparatus for separating a crystallizable hydrocarbon from its mixture with other hydrocarbons which comprises means for forming a chilled slurrry containing crystals of said hydrocarbon in a mother liquor, means for conducting said chilled slurry to a chilled slurry reservoir, a rotatable hollow drum dipping into said reservoir, an endless filter cloth passing around a portion of the periphery of said rotatable hollow drum and extending to a point spaced from said rotatable hollow drum, means for filtering mother liquor through the filter cloth to deposit a crystalline filter cake of said hydrocarbon on the filter cloth, a second rotatable drum, a second endless filter cloth passing around a portion of the periphery of said second rotatable drum and extending to a point spaced from said second rotatable drum, said second rotatable drum being mounted so as to impose a sufficient pressure on the crystalline filter cake to remove residual mother liquor from and to purify said cake, the pressure being such that some crystals may be formed on said second endless filter cloth, means for removing the cake from said first endless filter cloth, means for removing any crystals from said second endless filter cloth, and means for melting the removed crystals to obtain the the separated hydrocarbon.

References Cited in the file of this patent
UNITED STATES PATENTS

| 1,550,293 | Walker | Aug. 18, 1925 |
|---|---|---|
| 1,691,950 | Wright et al. | Nov. 20, 1928 |
| 2,229,582 | Merrill | Jan. 21, 1941 |
| 2,713,022 | Dole et al. | July 12, 1955 |
| 2,809,884 | Ratje | Oct. 15, 1957 |